US010387555B2

(12) United States Patent
Baumgartner et al.

(10) Patent No.: US 10,387,555 B2
(45) Date of Patent: Aug. 20, 2019

(54) CONTENT MANAGEMENT SYSTEMS AND METHODS

(71) Applicant: Normal Industries Incorporated, Culver City, CA (US)

(72) Inventors: Kris Baumgartner, Culver City, CA (US); Akshay Dhalwala, Culver City, CA (US); Jeffrey Downer, Culver City, CA (US)

( * ) Notice: Subject to any disclaimer, the term of this patent is extended or adjusted under 35 U.S.C. 154(b) by 682 days.

(21) Appl. No.: 14/920,825

(22) Filed: Oct. 22, 2015

(65) Prior Publication Data

US 2016/0110036 A1 Apr. 21, 2016

(51) Int. Cl.

| | |
|---|---|
| ***G06F 3/00*** | (2006.01) |
| ***G06F 17/24*** | (2006.01) |
| ***H04L 29/08*** | (2006.01) |
| ***G06Q 10/10*** | (2012.01) |
| ***G06Q 30/02*** | (2012.01) |

(52) U.S. Cl.

CPC .......... *G06F 17/241* (2013.01); *G06Q 10/10* (2013.01); *G06Q 10/103* (2013.01); *G06Q 30/02* (2013.01); *H04L 67/10* (2013.01); *H04L 67/1002* (2013.01); *H04L 67/1095* (2013.01); *H04L 67/26* (2013.01); *H04L 67/306* (2013.01)

(58) Field of Classification Search

CPC combination set(s) only.
See application file for complete search history.

(56) References Cited

U.S. PATENT DOCUMENTS

| | | | | |
|---|---|---|---|---|
| 2008/0052146 | A1* | 2/2008 | Messinger | G06Q 10/06 705/7.23 |
| 2009/0327865 | A1* | 12/2009 | Li | G06F 17/30 715/234 |
| 2015/0295851 | A1* | 10/2015 | Stein | H04L 63/102 709/225 |

* cited by examiner

*Primary Examiner* — Di Xiao
(74) *Attorney, Agent, or Firm* — Timothy T. Hsieh

(57) ABSTRACT

A method includes presenting a list of current projects in a dashboard interface, upon a successful login from a first user; allowing the first user to create or upload an asset once the user selects a project from the list of current projects and is presented with the list of all assets in the project; notifying all users associated with the project with a first notification that the first user uploaded an asset; receiving comments to the asset from a second user via an asset viewer and then sending out a second notification to all users associated with the project; processing changes made by the first user to the asset via the asset viewer based on the comments from the second user on the asset and then sending out a third notification to all users associated with the project; and sharing the asset with clients once the second user sends approval.

7 Claims, 13 Drawing Sheets

CONTENT MANAGEMENT SYSTEMS AND METHODS

CROSS REFERENCE TO RELATED APPLICATION

This application claims the priority benefit of U.S. Provisional Application No. 62/040,670 which was filed on Aug. 22, 2014 and entitled "Content Management Systems for Use in Editing, Exhibition and Distribution," the entirety of which is incorporated by reference herein.

TECHNICAL FIELD

The present disclosure generally relates to hardware-based systems containing software-based programs that can be implemented and used in a wide array of devices. More specifically, the present disclosure relates to content management systems and methods that can be used for a wide variety of different applications.

BACKGROUND

Typical presentations usually require the use of multiple file formats or different software programs. For example, a presentation would usually involve some type of presentation software that would allow the creation of slides via a basic text editor program, coupled with some type of document software to display and edit documents or a type of image software to display and edit images, a music or video player to exhibit music or video files, and a browser application that would be able to present pages from the Internet. As a result, the creation and display process of presentations is made cumbersome because of the involvement of the many different file types or programs that may be involved in a presentation.

Similarly, the marketing materials for a certain product (e.g., a film, a TV show, or a music album for instance) would require multiple file formats or programs to persuade a user to make a purchase of that product. For example, there may be an interactive ad on a website that plays a video and/or audio clip of the product, and that would bring the user to a separate site when clicked. There may be more programs involved when the user or consumer actually goes ahead and makes the purchase of a product. Furthermore, even more programs may be involved if analytics or statistical analysis are to be performed on the various purchases of a product over time. Therefore, the process of marketing a product, revising those marketing materials and allowing a user to purchase that product can be inefficient due to the involvement of these different software programs and file formats.

SUMMARY

Provided is a method that includes presenting a list of current projects in a dashboard interface, upon a successful login from a first user. The method also includes allowing the first user to create or upload an asset once the user selects a project from the list of current projects and is presented with the list of all assets in the project. The method further includes notifying all users associated with the project with a first notification that the first user uploaded an asset. The method also includes receiving comments to the asset from a second user via an asset viewer and then sending out a second notification to all users associated with the project. The method further includes processing changes made by the first user to the asset via the asset viewer based on the comments from the second user on the asset and then sending out a third notification to all users associated with the project. The method also includes sharing the asset with clients once the second user sends approval.

Also provided is a method that includes editing at least one section of a first combined document that corresponds to a second combined document, cross-maintaining the edits made to the at least one section of the first combined document into corresponding sections of the second combined document, and displaying the first combined document and the second combined document based on at least one adjustable user parameter.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
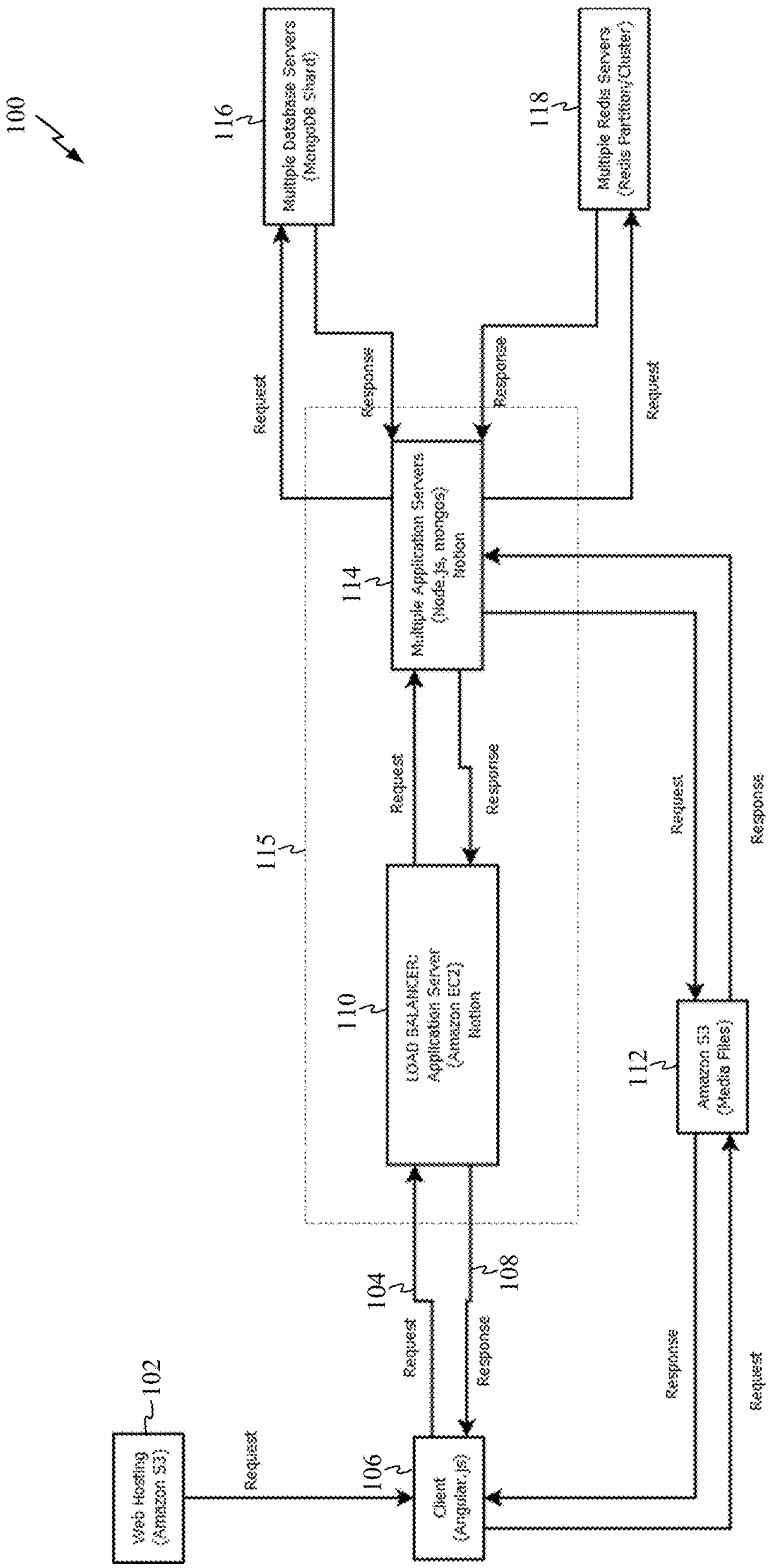
FIG. 1 shows a schematic view of an application structure according to aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

According to an aspect of the disclosure, a content management system is provided as a marketing platform that can protect brands, brand identities and/or trademarks. The content management system enhances the confidence, brand power, reach, robustness and productivity of marketing a brand. The pillars or main objectives/goals of the content management system are: (1) brand protection, (2) a streamlined workflow, accountability and communication and (3) ease of collateral content generation.

According to an aspect of the disclosure, the content management system has a number of goals for different components such as the dashboard, the editor, and the application.

For the dashboard, clear user accountability is a goal in that from the administrative point of view, edits and other changes can be viewed and accounted for. Also for the dashboard, the user should have confidence in being able to access the latest approved content. For the dashboard, the user should also have confidence in approving the distribution of materials. On the dashboard, there may also be dynamic templates that allow for the creation of or interaction with widgets, layout options or the organization of higher order structure.

For the editor, the editor program should be one tool or a single tool to create any kind of presentation or document. The focus for the creation experience is on the content, not the structure. The editor of the content management system also can separate the idea of editing for content and editing for layout or structure.

For the application, there is a seamless integration of the content management (CM) and the content creation. Creation time should be decreased, and engagement from the user should be increased and enhanced.

According to an aspect of the disclosure, the creation of the workflow is one of the features of the content management system. Content management can be integrated with content creation in the content management system, while the content management system expands its usage as a marketing tool. The content management system can be a complete platform to simplify a company's or brand's marketing workflow. The content management system is also secure and accountable, and allows its users to be confident that the materials are being used in the creation of marketing collateral and that the marketing collateral being distributed is correct. This is achieved with the ability to (1) "version" all assets tracked by the content management system, (2) "approve" these assets or mark these assets for approval and (3) "distribute" or communicate all activities to the parties involved. Through the content management system, the user can upload assets, send them through the approval process while communicating all required changes. The approved assets can then also be used to create marketing collateral, via the content management system editor, and then distributed to achieve an end result.

Versioning

Versioning is an action taken by the content management system that saves and manages an asset's revision history. The content management system also allows the user to choose which revision of an asset is to be displayed and used when the content management system attempts to retrieve it. Any asset can be versioned, and throughout the execution of the content management system, the currently selected version is always used. As new versions of the asset are added, the user can choose to promote a newer version to be the approved asset, which may also be viewed as the primary version, which causes the content management system to use that approved primary version any time the asset is accessed from that point onwards.

Combined with the approval feature of the content management system, the act of versioning allows the content management system to ensure that only appropriate content is served out. It also ensures that anytime a version is updated, all dependent assets (links, notions, shares, and so on) will always use the selected version, once approved.

Approval

Approval is an action taken by the content management system that allows a user with appropriate permissions to control the usage and distribution of assets. Approvals also allow a creative director or similar individual to ensure that the correct version of an asset is promoted to be the primary version, and to ensure that only approved assets can be distributed, used or shared, and to integrate with a business employee's hierarchy to ensure that correct decisions are made with respect to the user's preferences.

The system for administering approvals or the approval system integrated with every other feature of the content management system. The approval system also serves as the primary way of controlling what is created, updated and distributed in an organized fashion. Users can also communicate through the platform via notifications and comments until final approval by the user is achieved.

Distribution

The content management system also allows users to distribute assets and instances of a universal document format uniquely distinct to the content management system (and which may be also created by the content management system) in an online or offline fashion. That is, assets and instances of the universal document format may be distributed with a connection to a network or not, for example. The approval system discussed above ensures that assets can only be distributed after an appropriate user has enabled the asset for sharing. If an asset has been shared online and then approval is revoked by the user, the asset is immediately unavailable to any subsequent viewers. The content management system is able to keep track of every distributed asset, allowing the users to maintain an accurate portrait of their marketing activity. The users are also granted the ability to revoke access to distributing assets if the need arises.

Instances of the universal document format may also be distributed offline via the portable document format (PDF) from Adobe, which can be read by the program known as Adobe Acrobat, or the universal document format. Through a native client, fully interactive instances of the universal document format can be viewed offline with the collection of analytics and other data, for example, occurring when the user goes online, or offline after an online session.

Analytics

There may be two kinds of analytics data collected by the content management system: (1) standard marketing engagement metrics measured via distributed assets (such as click through rates, time spent viewing, and so on), and (2) company meta metric. Company meta metrics provide data that allows users utilizing the content management system to analyze and observe how companies in various verticals (and within the same vertical) use the content management system to improve their workflow.

Application Elements

The content management system has a variety of application elements. For example, a given application screen may display a workspace, a new project dialogue, an edit project dialogue, a project detail list, a new/upload asset dialogue, and an edit asset dialogue. An application screen can also display a drafts list, a media library collections list, a new collection dialogue, an edit collection dialogue, a media library collection detail, a media library media list, a new media dialogue, an edit media dialogue, an asset viewer, a share asset dialogue, an asset editor, an user profile, a team profile, and an add user dialogue.

The workspace displays a list of all projects for the current team that the current user has access to. The workspace also allows the current user to create a new project, delete a project or manage project details.

The new project dialogue is displayed when the new button is clicked in the workspace. The new project dialogue allows the current user to create a new project for the current team. The user can enter the project name and adds team members as appropriate.

The edit project dialogue is displayed when the properties button is clicked on a project. The edit project dialogue also allows the current user to manage the current settings for the project.

The project detail list is a list displaying all assets contained in the current project. The project detail list also allows the current user to version assets, according to the versioning function/action described above, by dragging and dropping, deleting existing assets, creating new assets, sharing an asset or approving/blocking an asset. The aforementioned actions may also be itemized as icons, buttons or selections in a pull-down menu that the user can click on or interact with. The project detail list also allows the current user to manage the settings for the current project via the edit project dialogue.

The new/upload asset dialogue is displayed when the new button is clicked in the "projects" list. The new/upload asset dialogue allows the current user to create a new asset or upload an existing asset into the project. The user enters the asset name and other information as appropriate.

The edit asset dialogue is displayed when the "properties" button is clicked on a media item. The edit asset dialogue allows the current user to manage the current settings for the current type of media.

The asset viewer displays the current asset that the user has selected. This may be the primary way of interacting with assets. The asset viewer also contains an area where the asset is displayed (PDF, image, universal document format, etc.). The asset viewer also contains a comment area where users can read and respond to comments. The asset viewer also contains a tools area that contains the ability to share, approve/block, or update the asset, with the aforementioned actions also being able to be itemized as icons, buttons or selections in a pull-down menu that the user can click on or interact with.

The share asset dialogue is displayed when the current user clicks the "share" button or icon in the asset viewer or the project detail list. The share asset dialogue allows the current user to share the asset to other users of the content management system, or users outside of the content management system.

The asset editor displays the current asset that the user has selected. This may be the primary way of editing assets. The asset editor is also similar to the asset viewer, but with additional functionality for editing the asset.

The user profile displays the profile for the current user. The user profile also allows the user to change pertinent user information such as the users e-mail address, password, profile picture, contact information, and so on.

The team profile displays the profile for the current team. The team profile also allows authorized users to change pertinent team information such as the team name, the team profile picture, team contact information or other details, and also allows authorized users to manage other authorized users that may be members of the team or may not be official members yet.

The add user dialogue is displayed when the "new user" button or icon is clicked on in the team profile. The add user dialogue allows the current user to add new users to the team with appropriate permissions.

User Classes

The different user classes can include: administrator, creative director, team leader, and team member. Also, anytime the term "user" is mentioned in this disclosure, it can mean that the user is an administrator, creative director, team leader, team member or a generic user with no affiliation with any team or project.

An administrator has full access to the content management system account. The administrator is also able to manage billing information and has all the permissions of the lower user classes.

A creative director has access to the content management system account that is at a lower level when compared to the administrator. The creative director may be able to manage certain pieces of information that pertain only to creative or marketing needs.

A team leader has access to the content management system account that is at a lower level when compared to the creative director. The team leader may only be able to manage certain pieces of information pertaining to the team, such as the team name, the team profile picture, the team contact information and other details. The team leader may also be authorized to grant membership to the team for users, manage current team members and also users who may not be official team members yet.

A team member has access to the content management account that is at a lower level when compared to the creative director. The team member may only be able to manage certain pieces of information pertaining to themselves, such as their e-mail address, password, profile picture, contact information, and so on, via the user profile.

Example Application Flows of the Content Management System

For the sample application flows, we have in a company: person A, a creative director and administrator; person B, also a creative director and administrator; and person C, a team member.

The first scenario has person C being a team member on a sports event project. Person C uploads a document deck, or collection of PDF files, for example, that details one of the many packages that person C's company (or "the company") normally builds. This document deck will be sent out to multiple high-value clients of the company. Person B, being a creative director and administrator of the company, is responsible for verifying and reviewing the document deck, suggest changes if necessary, and then approve the document deck for distribution to the company's clients.

The sample workflow for this first scenario is as follows:

(1) Person C logs into the content management system from its front page. Upon a successful login, person C is taken to the main dashboard where person C is presented with a list of current projects.

(2) From the main dashboard, person C clicks on the sports event project and is presented with a list of all assets for the sports event project.

(3) Person C then clicks on a "new" button or icon and is presented with a dialogue of some sort. Here, person C can either create a new asset for use in the editor, or upload an existing asset and provide some general information for it.

(4) Person C then decides to upload a document deck pertaining to the sports event project. Once the uploading of the sports event document deck is completed, person C is taken to the asset viewer. This completed uploading action sends a notification that a new item was added to anyone or any users that are involved with the sports event project.

(5) Until this sports event document deck is approved by a creative director or team leader (such as person A or person B), person C may not distribute the sports event document deck to the company's clients as that ability is blocked at first. The ability for person C to distribute the sports event document deck is "un-blocked" and allowed access to once a creative director or team leader approves of it. Once approved, person C may then distribute the sports event document deck to the company's clients. While awaiting approval to distribute the sports event document deck, person C may navigate away to other parts of the content management system application in order to do other work and complete other tasks or work responsibilities.

(6) Meanwhile, person A logs into the content management system.

Person A receives a notification that a new asset was uploaded into the sports event project, a project that person A has control over as a creative director.

(7) Person A then clicks the notification in the notification area and is taken directly to the asset viewer, where person A is able to view the sports event document deck for the sports event project.

(8) After viewing the asset, person A sees that changes need to be made—for example, correcting a misspelling of a word or other typo, or fixing outdated information. Person A adds a comment on the asset and indicates the desired changes. At this point, person A still leaves the asset blocked from sharing. This action sends another notification to anyone that is involved with the sports event project.

(9) Person C, still logged into the content management system, receives the notification that person A has commented on the sports even document deck. Person C clicks the notification in the notification area and is taken directly to the sports even document deck in the asset viewer.

(10) Person C sees the comment chain indicating the changes that need to be made on the sports event document deck.

(11) Person C then makes the appropriate changes to the sports event document deck in an image/photograph editing software or the editor and then clicks an "update" button or icon in the asset viewer. From this dialogue, person C then uploads the new version of the changed sports even document deck. This action sends another notification to all the sports event project members.

(12) Person A receives the notification that the sports event document deck has been updated with a new version. Person A then clicks the notification and is taken to the asset viewer.

(13) Person A views the updated version of the sports event document deck and is satisfied with it. Person A then clicks an "approve" button or icon in the asset viewer, which now allows the sports event document deck to be shared with the clients of the company. This action then sends another notification to all the sports event project members. At this point, person A can either share the sports event document deck with the clients via a "share" button or icon or person A can let other authorized team members send the sports event document deck out to the company's clients.

(14) Person B also receives the notification that the sports event document deck has been updated or changed, by person C. If person B chooses to look at the sports event document deck, person B can also add comments and un-approve the sports even document deck if person B notices something that needs to be changed at the last minute, for example.

(15) Person C receives the notification that the sports event deck has been approved. Person C clicks the notification and is taken to the asset viewer where the "share" button or icon can be clicked by person C to distribute the sports event deck to the company's high-value clients.

(16) Person C shares the deck, and the clients are satisfied once they receive it.

The second scenario occurs once person C has sent out the sports event document deck to multiple high-value clients of the company. A few days later, the sports event document deck has been updated via an outside tool and now needs to be resent. Person C will upload the new revised sports event document deck and then uses it as a new version of the existing sports event document deck. Depending on how the original sports event document deck was sent, there may be a few different ways to update it. The content management system also allows for an efficient and effective way to complete this scenario.

A third scenario involves a brand kit created for a client of the company named D. Person C wants to upload the brand kit to the content management system for person A and person B to approve. Months later, client D changes the logo and now person C needs to update the logo and then get it approved as the main version of the logo. The content management system also allows for an efficient and effective way to complete this scenario.

A fourth scenario involves person A coming up with a brand new project. Person A wants to create a new project in the content management system and set up his team so that they can begin work on creating the document decks and other materials for the project. The content management system also allows for an efficient and effective way to complete this scenario.

There may also be other scenarios not listed above that the content management system is able to handle in an efficient and effective manner.

Objectives of the Content Management System

One of the objectives of the content management system is to ensure clear administrative accountability. This means that if someone were to set strict access rules, then they would be liable for the consequences of setting those rules and not someone else. The content management system would also not be held liable. This is important due to fitting in to the current bureaucracies and hierarchies of modern businesses.

Another objective of the content management system is to make users feel confident that they always have access to the latest approved content. Another related objective is to also make users feel confident that the latest approved materials are being used in all of the users business dealings. Yet another related objective is making users feel confident that nothing will be sent out without appropriate approval and that existing content can be revoked if needed. Therefore, accountability over the dissemination of materials is ensured and provided.

Another objective is the ability to homogenize the creation of all documents, whether the document is a website, a microsite, a slide show, a presentation, a pitch deck, a document deck or a PDF-like document. The content management system applies the same creation process for everyone across the board. As a result, new tools or skills to create varied amounts of content do not need to be learned or built.

The editor of the content management system also provides users with the experience of creating content, not structure. Another objective of the content management system is to encourage users to keep writing and creating, without having to worry about block structure or block management. The content management system brings about a simpler document object model that an average user does not have to worry about. The existing document object model is being entrenched in traditional and outdated coding conventions. Therefore, an important objective of the content management system is to seamlessly integrate content management and content creation.

Content Management System to Edit, Revise and Distribute Content

According to an aspect of the disclosure, a content management system and online workspace tool is provided that allows users to create, edit, revise, organize, update, display, exhibit, distribute and stay notified about combined documents. The combined documents may include a wide variety of other content such as images, text, videos, hyperlinks, websites, music and audio files, different file formats, different document types and more. Combined documents may also make up workspaces. The combined document type is also a distinct creation from the content management system of the present disclosure. In one implementation, the content management system can include a unified editor program, an exhibition system, and a distribution marketplace system.

The unified editor may use sections like modular building blocks to create any form of website, presentations or other types of documents. A section is a distinct collection of content that is composed of "fields" which may be distinguished semantically by title. "Fields" are atomic blocks of content such as text, images, video, forms, music, and so on. The complete modularity of sections allow a number of novel implementations, such as being able to create documents that share sections and can be cross-maintained across different formats. For example, if a spelling error is corrected in Section 1 while editing Website A, it will be instantly updated in Document B.

The unified editor can also be cloud-based and be used to edit content that may require a full set of editing software, such as high quality video. Because the video editing software is stored on a cloud, all the necessary software required to edit video can be instantly accessed via the cloud. Software taking up large amounts of memory used to edit content such as music may also be stored in the cloud.

The exhibition system allows the display of the edited and organized content. The content displayed by the exhibition system may be set with certain permissions for viewing and editing, and said permissions may be governed by a flexible level of permission granularity rules so that a team member can work on one section without effecting the display of another section. The look of a finalized presentation, for example, may be determined by the content. An algorithm can detect the dominant color of a cover photo or video and select a color palette based off of it. Algorithms can also exist for making a section have a certain color background or no color, arranging images, and more. In one implementation, provided is a focus filter system that allows the filtering of important content based on a slider or sliding mechanism. That is, the focus filter system allows adjusting the display of certain content based on user preferences and the priority that a user may give certain parameters.

The distribution marketplace system allows the marketing and distribution of combined documents or other files such as films, music, video files, e-books, software, and so on to users and potential customers. Once such files have been edited, revised, organized or displayed via the unified editor or the exhibition system, the distribution marketplace system may package and market combined files to interested consumers for purchase. The distribution marketplace system is also equipped with all the necessary financial transaction software or backend to accept and process payments for purchases. The distribution marketplace system also features a concentrations feature. Concentrations provide a way to personalize combined documents for specific audiences or users. Content may also be personalized with a variable level of granularity while keeping cross-maintainability between the concentration and the original combined document with regards to sections or fields not made unique.

FIG. 1 shows a schematic view of an application structure 100 according to aspects of the disclosure. The application structure 100 includes a web hosting module 102, a client module 106, various requests 104 and responses 108, an application server 115 that includes a load balancer module 110 and a multiple application server module 114, a media file hosting module 112, a multiple database server module 116 and a multiple redis server module 118.

The client module 106 includes front-end software to access the content management system of the present disclosure. In one implementation, the client module 106 may be a browser-based application written with AngularJS, where JS stands for javascript. In one implementation, the client module 106 may be a client for Windows, Mac OS X, iOS, Android and other devices. The web application may be hosted on a simple storage service (S3) server such as the web hosting module 102 with Cloudfront as a content delivery network (CDN). The S3 server may be provided, for example, by Amazon.com Inc., and may be a cloud storage service. The client module 106 also interactions with various application servers, such as the load balancer module 110 and/or the multiple application server module 114 in order to create and manage combined documents, handle teams, manage real time user communications and facilitate the real time editing of combined documents. The client module 106 may also perform all viewer functions, which may be executed in the exhibition system as described above for combined documents.

The application server 115 includes the load balancer module 110 and the multiple application server module 114. The application server 115 is a back-end server designed to handle all requests 104 and respond accordingly, via responses 108, to the client module 106. The application server 115 may also be written with NodeJS (as seen in the multiple application server module 114) and will run on an elastic compute cloud (EC2) platform (as seen in the load balancer module 110). The EC2 platform may be provided, for example, by Amazon.com Inc., and may be a cloud computing service. The EC2 platform may also be provided by the Azure cloud storage and compute platform, provided by Microsoft, Inc. In general, a cloud storage service is used to host the client application and media files, and cloud computing services are used to host various database servers and application servers. The load balancer module 110 may be designed to spin up multiple application servers 115 as the need arises.

The application server 115 is also designed as a stateless server. Each request 104 is handled and responded to, via responses 108, independently of other requests 104 and responses 108. Any requests that require user authorization may include an authorization token with the request, in order for the application server 115 to verify the user.

The application server 115 responses 108 include, but are not limited to, the following scenarios.

User Management:

User Creation—A response transmitted to create new user accounts or when new user accounts have been created.

User Login—A response transmitted to respond to user login requests.

User Authentication—A response transmitted to authenticate users attempting to login.

User Authorization—A response transmitted to authorize users via an authorization token who attempt to access protected resources.

User Deletion—A response transmitted to delete an existing user account.

Combined Document Management:

Combined Document View Request—A response transmitted to retrieve the combined document from the database and deliver it to the user, if the user is authorized.

Combined Document Editing—A response transmitted to edit the existing combined document, if the user is authorized.

Combined Document Updating—A response transmitted to update existing portions of the combined document, if the user is authorized.

Combined Document Creation—A response transmitted to create a brand new combined document, if the user is authorized.

Real time Editing—A response transmitted to facilitate the real time editing and collaboration on combined documents, if the user is authorized.

Combined Document Commenting—A response transmitted to facilitate combined document comments, requests and user communication regarding combined documents, if the user is authorized.

Teams:

Team Creation—A response transmitted to create a brand new team, if the user is authorized.

Team Security—A response transmitted to handle all permissions and security for individual team members and control access to protected resources, if the user is authorized.

Team Communication—A response transmitted to facilitate realtime team communication, if the user is authorized.

Combined Document Creation—A response transmitted to create a brand new combined document, if the user is authorized.

Access to Protected Resources:

S3—A response transmitted for the server to facilitate the generation of signed links for accessing and uploading media to and from the S3 server.

Access to Database:

MongoDB/Redis—A response transmitted for the server to facilitate data access between the database servers and the clients.

Image/Video Processing:

Combined Document Processing—A response transmitted for the server to handle all real time image and video processing for combined documents.

The media file hosting module 112 may be another S3 server, as described above. The media file hosting module 112 is a part of the back-end storage solution for the content management system of the present disclosure. The media file hosting module 112 may also be utilized for the storing or processing of all or various media files such as images, videos or audio files. Such files may be stored on a S3 server, implemented with Cloudfront as a content delivery network (CDN), and delivered as needed based on the application server 115, as described above.

The multiple database server module 116 is one part of the back-end storage solution for the content management system of the present disclosure. The servers in the multiple database server module 116 may run on an EC2 platform and may also be in a sharded configuration for maximum flexibility. Multiple database servers may also then exist, each holding a fragment of the total data. These multiple database servers will also be replicated for optimal data integrity and security. The data that the database servers in the multiple database server module 116 will store includes, but is not limited to, the following: user information, team information, combined document information and data, and basic analytics on combined documents or other files, when they are marketed and sold in the distribution marketplace system as described above.

The multiple redis server module 118 is the other part of the back-end storage solution for the content management system of the present disclosure. The servers in the multiple redis server module 118 may run on an EC2 platform and may also be in a sharded or partitioned configuration for maximum flexibility. Multiple redistribution servers may also then exist, each holding a fragment of the total data. These multiple redistribution servers may also be replicated for optimal data integrity and security. The data that the redistribution servers in the multiple redis server module 118 will store includes, but is not limited to, the following: combined document information and data for the purposes of real time editing, user information for the purposes of real time communication, and session information on an as-needed basis.

The redis server is a different type of database server and can be, for example, a key or value in-memory database. The redis server has its own set of advantages and disadvantages compared to MongoDB, or the database server that can be used for the main storage. Because of these advantages and disadvantages, two different types of database servers are used to handle the workloads that best suit them. In the case of the redis server, real-time communication and collaborative editing is best served by a multiple redis server module 118 while document and user storage is best served by a MongoDB database server, for example.

Figure 2:
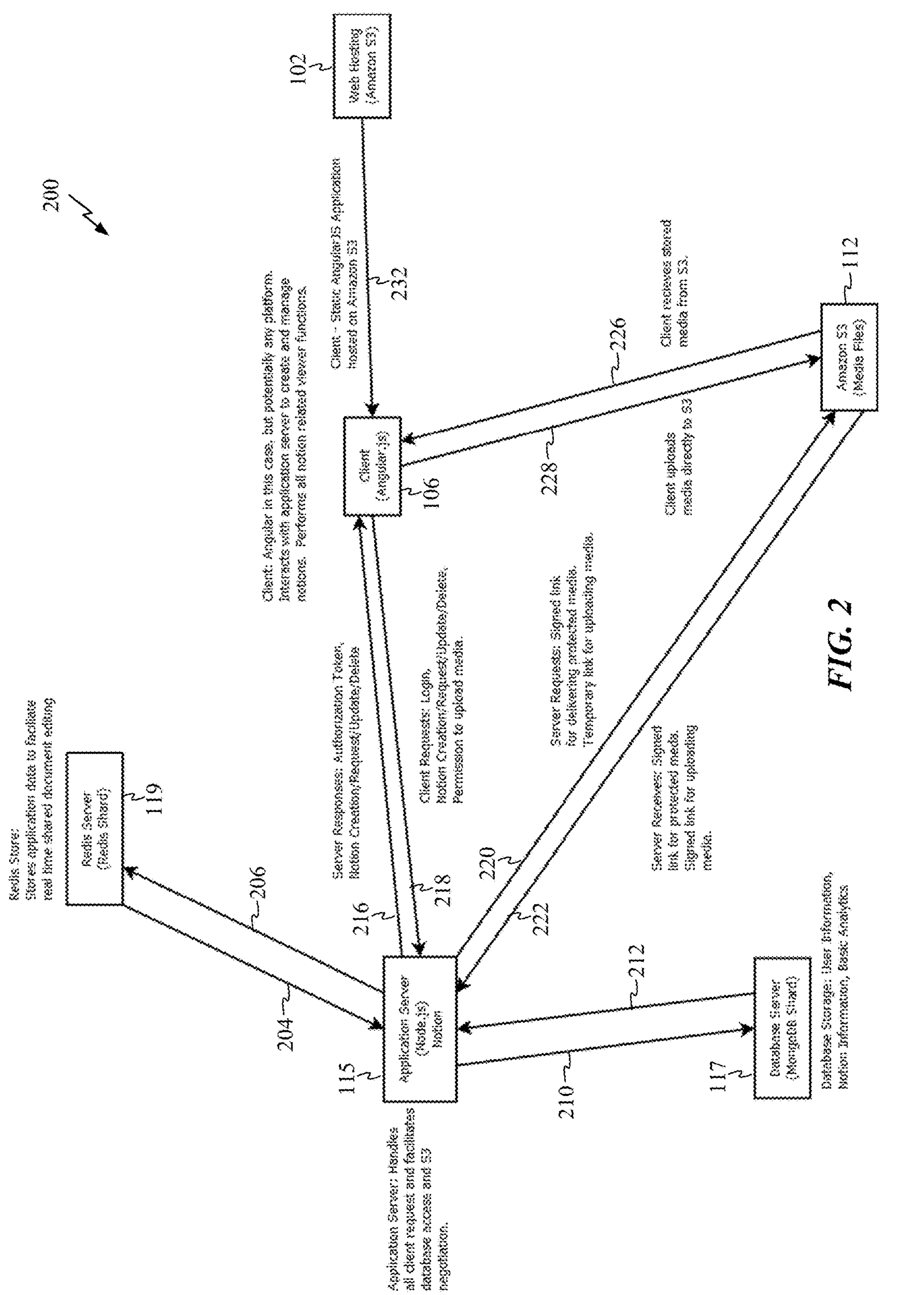
FIG. 2 shows a schematic view of another application structure according to aspects of the disclosure.

FIG. 2 shows a schematic view of another application structure 200 according to aspects of the disclosure. The application structure 200 of FIG. 2 contains similar components as the application structure 100 in FIG. 1, with the exception of the redistribution server 119 being one of the redistribution servers in the multiple redis server module 118, and the database server 117 being one of the database servers in the multiple database server module 116. The application structure 200 also shows requests 206, 210, 220, 218, 228, as well as responses 204, 212, 222, 216, 228 and 234. The request 218 includes client requests such as login, combined document creation/request/update/deletion, and permission to upload media. The response 216 includes server responses such as authorization tokens and combined document creation/request/update/deletion. The request 220 includes server requests such as signed link requests for delivering protected media and temporary links for uploading media. The response 222 includes signed links for protected media and signed links for uploading media. The request 228 includes the client uploading media directly to a S3 platform (the media file hosting module 112). The response 226 includes the client receiving stored media from the S3 platform (the media file hosting module 112). The response 232 may include static AngularJS application code hosted on a S3 platform.

The redistribution server 119 may store application data to facilitate real time shared combined document editing. The application server 115 may handle all client requests and facilitate database access as well as S3 negotiation. The database server 117 may store user information, combined document information and basic analytics about the combined documents or other files and their performance in the distribution marketplace system, for example, as described above. The client module 106 may be angular in this case, but can potentially be any platform. The client module 106 also interacts with the application server 115 to create and manage combined documents. The client module 106 also performs all combined document related viewer functions. The web hosting module 102 is for the web hosting of the client module 106 and can be, for instance, a S3 platform with Cloudfront as a CDN. The media file hosting module 112 stores various media files, and can also be implemented on a S3 platform.

Figure 3A:
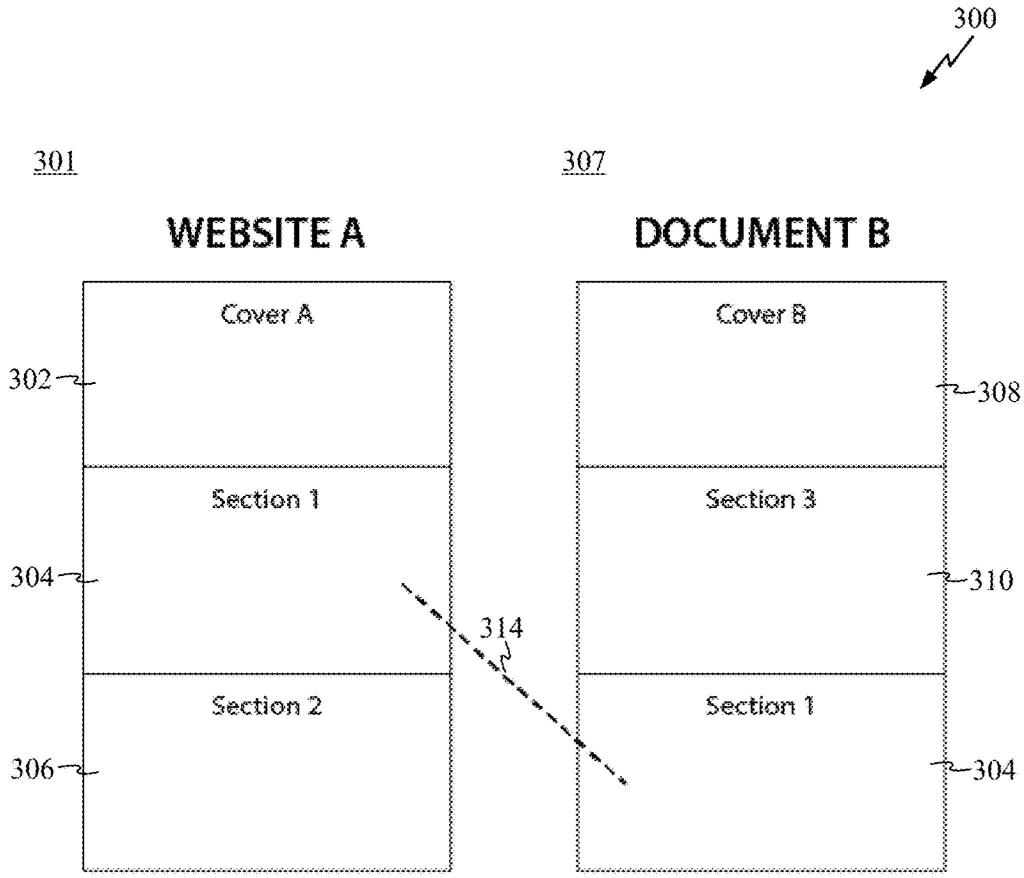
FIG. 3A shows a schematic view of a section diagram according to aspects of the disclosure.
Figure 3B:
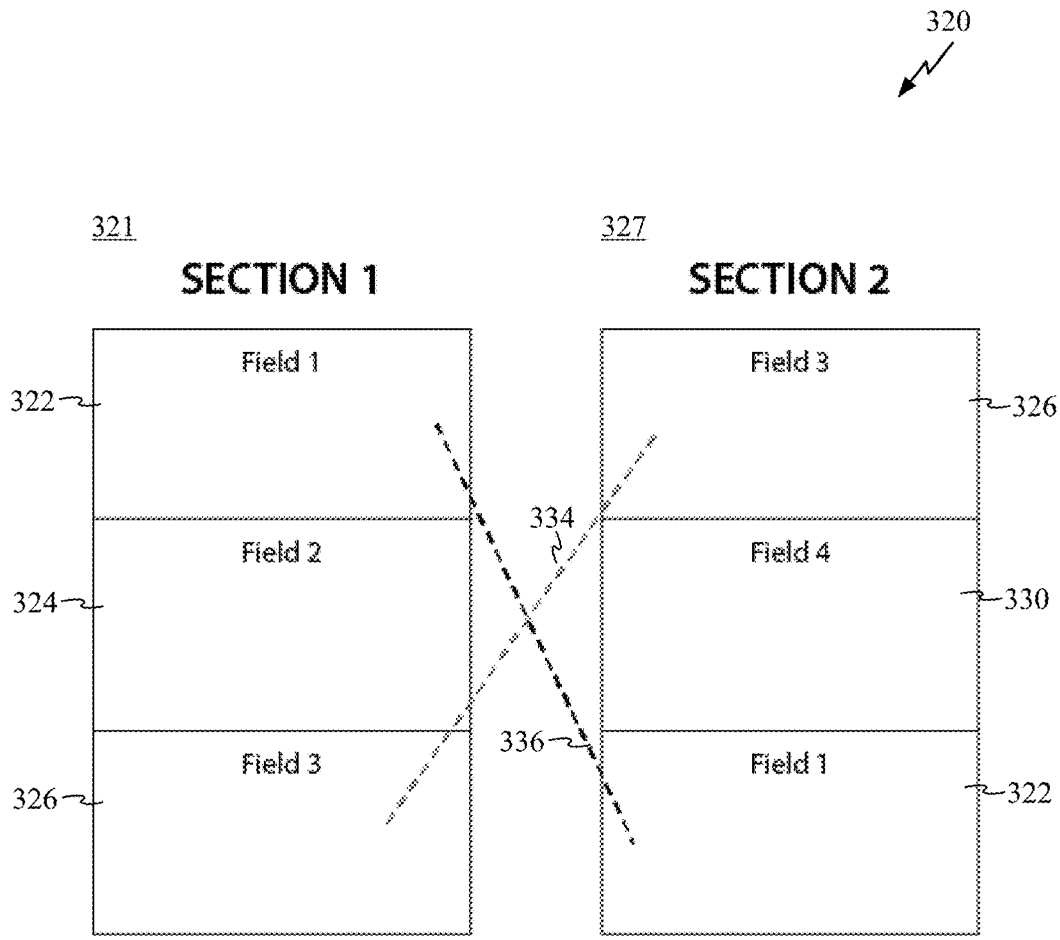
FIG. 3B shows a schematic view of a field diagram according to aspects of the disclosure.
Figure 3C:
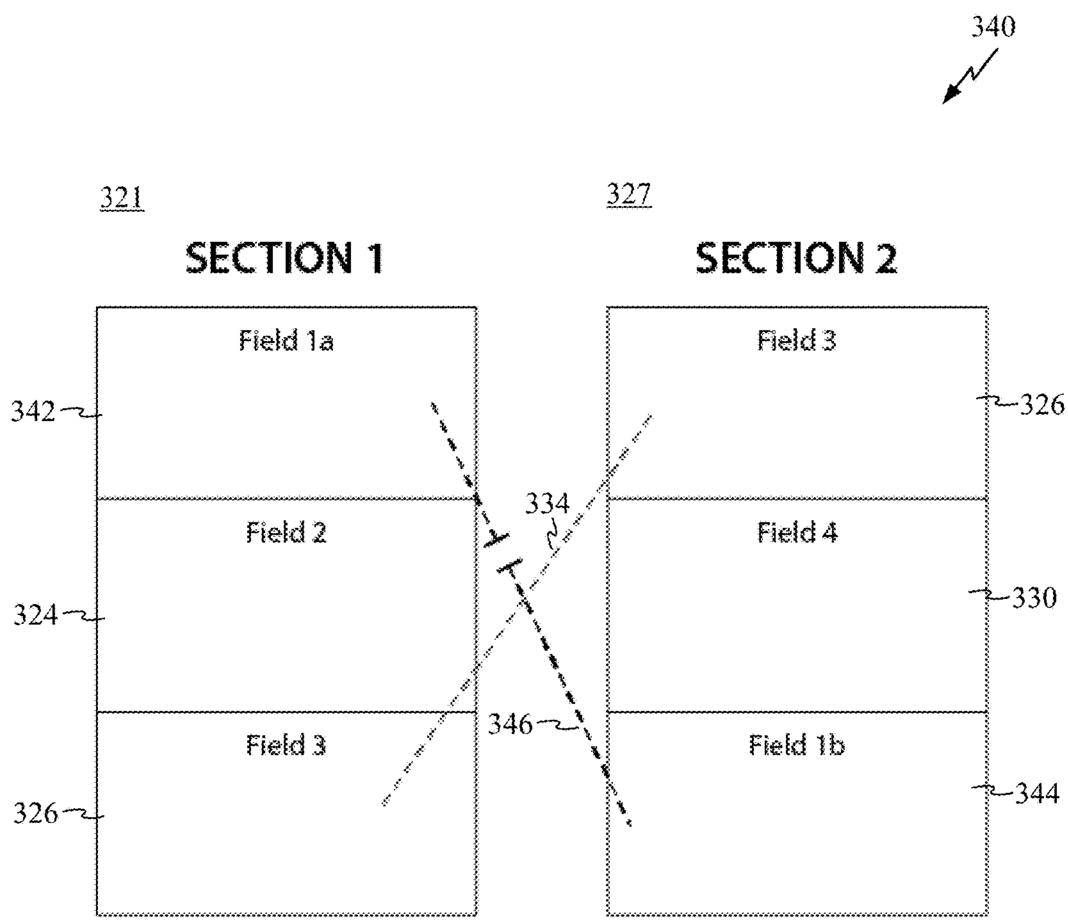
FIG. 3C shows a schematic view of another field diagram according to aspects of the disclosure.

FIGS. 3A-3C show schematic views of section diagrams and field diagrams according to aspects of the disclosure. A combined document includes sections, and sections are used like modular building blocks by the unified editor to create the combined document, e.g., any form of document, website or presentation. A section is a distinct collection of content that is composed of fields, and each section may be distinguished semantically by its title. Fields are atomic blocks of content such as text, images, video and forms.

FIG. 3A shows a section diagram 300 illustrating various sections of website A 301 and document B 307. Website A 301 includes the sections of a cover A section 302, a section 1 304, and a section 2 306. Document B 307 includes the sections of a cover B section 308, a section 3 310, and a section 1 304, shared with website A 301. Two combined documents such as a website (website A 301) and a document (document B 307) can share a section (e.g., section 1 304). This shared section (section 1 304) is cross-maintained between each format by the cross-maintaining update 314. For example, if a spelling error is corrected in section 1 304 of website A 301, then the same change will be instantly updated in the section 1 304 of document B 307. The order of sections may not be cross-maintained in the different combined documents and may also be unique to each combined document. In one implementation, an individual section (e.g., section A) can be set to correspond to another section (section B), even though they are not the same. They could be similar sections, for example. Therefore, any changes to section A will also be made, or amplified, or modified, in the corresponding section B in a different document type. Cross-maintaining updates may also occur from one combined document to many corresponding combined documents.

FIG. 3B shows a field diagram 320 illustrating various fields of section 1 321 and section 2 327. The same cross-maintaining feature described above for sections in documents can also apply to the lower granularity level of fields in sections. Section 1 321 includes a field 1 322, a field 2 324 and a field 3 326. Section 2 includes the field 3 326, a field 4 330, and the field 1 322. Because section 1 321 and section 2 share field 1 322, any update to field 1 322 in section 1 321 will cause a parallel update in the field 1 322 of section 2 327 by cross-maintaining update 336. Similarly, any update to field 3 326 in section 1 321 will cause a parallel update in the field 3 326 of section 2 327 via cross-maintaining update 334. In one implementation, the parallel update may be the same change. In one implementation, the parallel update may be a slightly similar or different change. In one implementation, the two fields selected to perform a parallel update may not be identical, and can just be slightly similar or follow some other pattern, mold or template.

FIG. 3C shows a field diagram 340 illustrating various fields of section 1 321 and section 2 327 like FIG. 3B. However, the difference is that cross-maintenance termination update 346 ends the cross-maintenance link between a field 1*a* 342 and a field 1*b* 344, when they used to be identical. Therefore, from this point onwards, any changes made to field 1*a* 342 or field 1*b* 344 will be made independently, and they will go on to become completely different and separate fields, instead of identical fields. The cross-maintenance termination update 346 also applies to any sort of parallel update, be it an identical or similar change. The cross-maintenance termination update 346 also applies to ending the cross-maintenance relationship between any two fields, be they identical, similar or different. Cross-maintaining updates may also occur from one field to many corresponding fields.

Permissions for editing and viewing may also be granted on a field, section, document or work space. This completely flexible level of permission granularity means that a team member can, for example, work on section Y without any knowledge about document X. The team member, however, can always be provided such knowledge, but the sharing of such knowledge is not necessary for editing and can be kept secret, which might be desired if confidential information is involved with any of the documents, sections or fields.

Figure 4A:
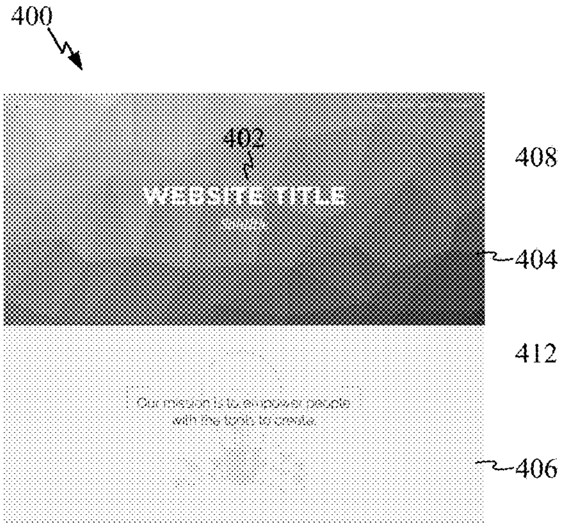
FIG. 4A shows a screenshot of an example website created by a content management system according to aspects of the disclosure.
Figure 4B:
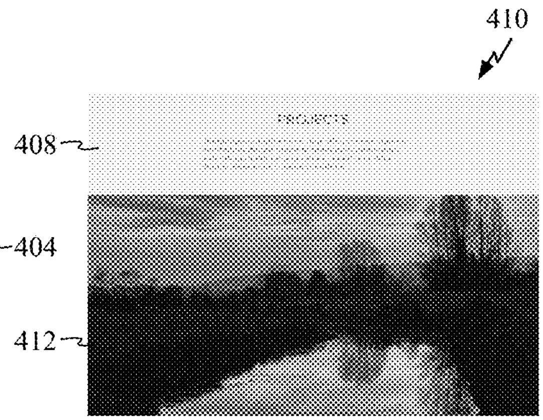
FIG. 4B shows a screenshot of an example document created by a content management system according to aspects of the disclosure.
Figure 4C:
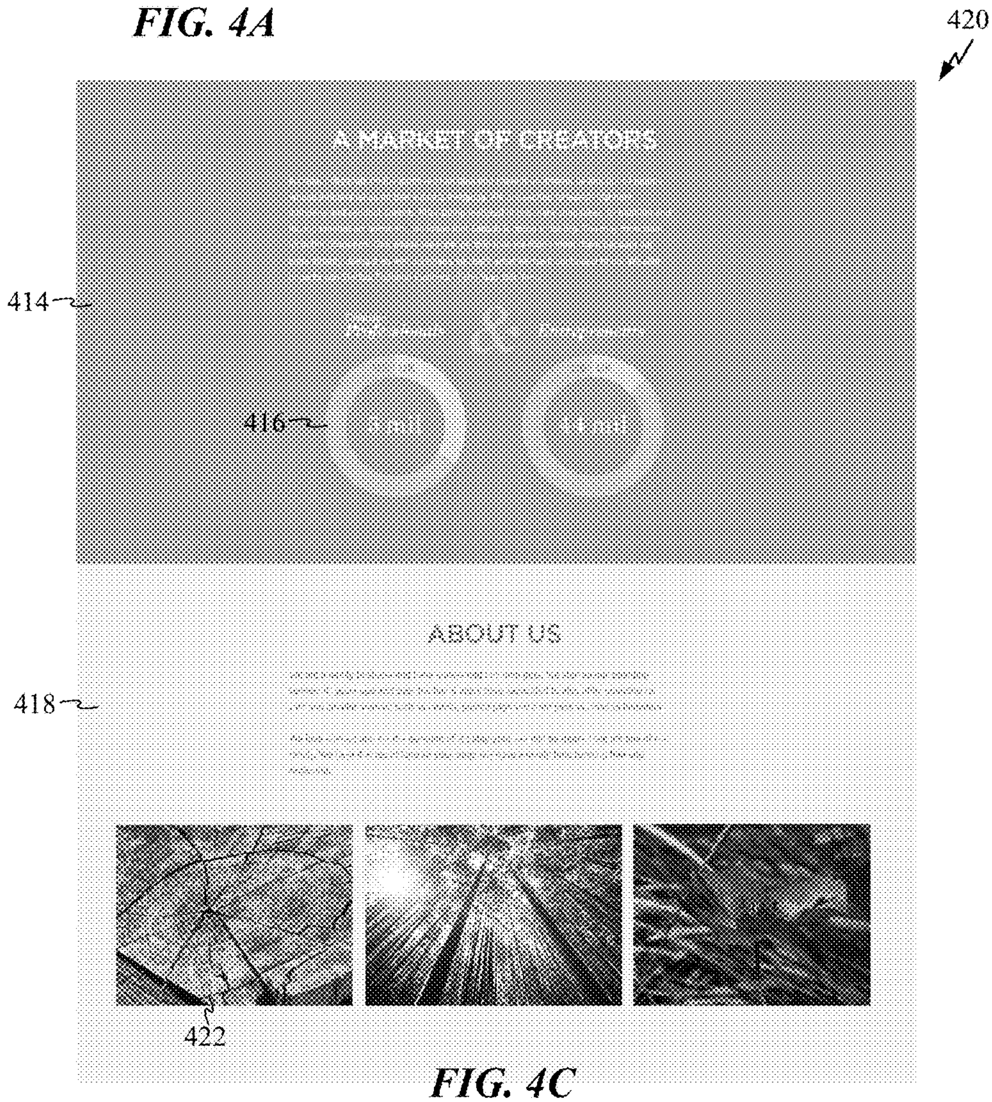
FIG. 4C shows a screenshot of an example presentation created by a content management system according to aspects of the disclosure.

FIGS. 4A-4C show screenshots of example websites, documents and presentations created by a content management system according to aspects of the disclosure.

FIG. 4A shows an example website 400 including a first section 404 and a second section 406. The first section 404 may also include a text field 402, such as a title for the website, or other text. Other fields in the first section 404 include the background image, which is not labeled but shown in FIG. 4A. The second section 406 also includes fields such as text and images, which are shown but not labeled for simplicity. The first and second sections 404 and 406 make up the website 400, and the fields (such as text field 402) in turn make up the first and second sections 404 and 406.

FIG. 4B shows an example document 410 including a first section 408 and a second section 412. The first section 408 has fields including text and the second section 412 has fields including an image, a video, or a composite of multiple images or videos.

FIG. 4C shows an example presentation 420 including a first section 414 and a second section 418. The first section 414 includes fields of text and a graphics field 416. The graphics field 416 may be an image, an interactive script, a video or a hyperlink to another website. The second section 418 also includes text fields as well as an image field 422. The image field 422 can be a static image, an animated image, a video, a composite of static or animated images or an interactive script.

All the different combined documents of the website 400, the document 410 and the presentation 420 may all make up a workspace, where they can all be worked on.

The look of a combined document as it is displayed can be determined by the content of the combined document. For example, an algorithm can detect the dominant color of a cover photo or video and pick a color palette based off of it. There may also be algorithms that decide whether to make a section having a certain color background or no color, arranging images and others. There also exists a focus filter system that can adjust the display of a combined document in the exhibition system based on priority parameters adjusted and provided by the user.

Figure 5:
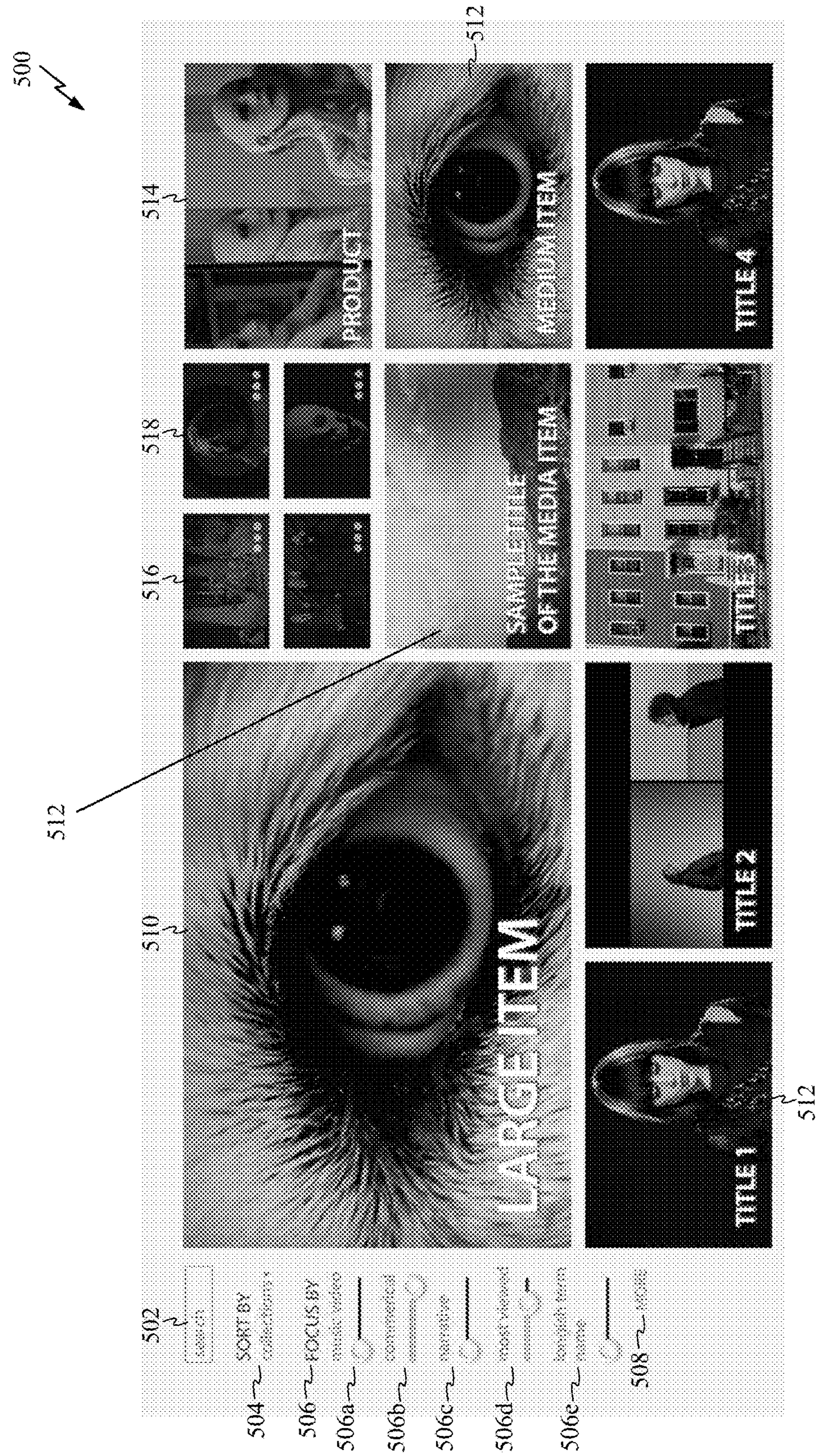
FIG. 5 is a potential screenshot of a focus filter diagram illustrating the organization of content by a content management system according to aspects of the disclosure.

FIG. 5 is a potential screenshot of a focus filter diagram 500 illustrating the organization of content by a content management system according to aspects of the disclosure.

Instead of filtering content with toggled on-off switches, the disclosed focus filter system can adjust the focus of a type of content based on a slider or sliding mechanism, such as sliders 506*a-e*. This way, users can sort through or browse content in a more natural way by setting a focus for a specific type of content that they are looking for instead of completely removing other content from view. Multiple categories can be focused in on and will weigh the items in the search result appropriately. For example, if a user has family and comedy genres set to be the highest priority, then items categorized by both criteria will be the largest, while the family genre and the comedy genre, individually, will have medium priority and show up less, while items having less to do with these two genres will be very small and graphically put out-of-focus.

The focus filter diagram 500 includes search bar 502, a sort by pull-down menu 504, a focus by selector 506, sliders 506*a-e* based on various criteria, and a more button 508. As shown in FIG. 5, the sliders 506*a-e* can include, for example, a music video slider 606*a*, a commercial slider 506*b*, a narrative slider 506*c* a most-viewed slider 506*d* and a longish term name slider 506*e*.

The focus filter diagram 500 displays a large item 510, a medium item 512, a variable medium item 514, a small item 516, and a variable small item 518. Depending on the criteria selected in the sort by pull-down menu 504, the focus by selector 506 and sliders 506*a-e*, the items with the highest priority will show up as the largest and clearest (the large item 510), items with middle priority will show up as medium-sized (the middle item 512) or with medium clarity or some other visual trait changed (the variable medium item 514), and the items with the lowest priority will show up as the smallest size (the small item 516) or made blurrier or harder to see or with some other visual trait changed (the variable small item 518). Therefore, the items with the highest priority can be most easily seen, while items with lower priority are harder to see, according to user adjustments with respect to preferences set by the sliders 506*a-e* and other adjusters 502, 504 and 506. In one implementation, the sliders 506*a-e* can be added to, or diminished, and the content which they adjust may be chosen by the user based on key word entries or another process. In one implementation, there can be more adjustment buttons and factors that are not currently shown in FIG. 5 that allow a user to further customize the view or display seen in the focus filter diagram 500.

Figure 6:
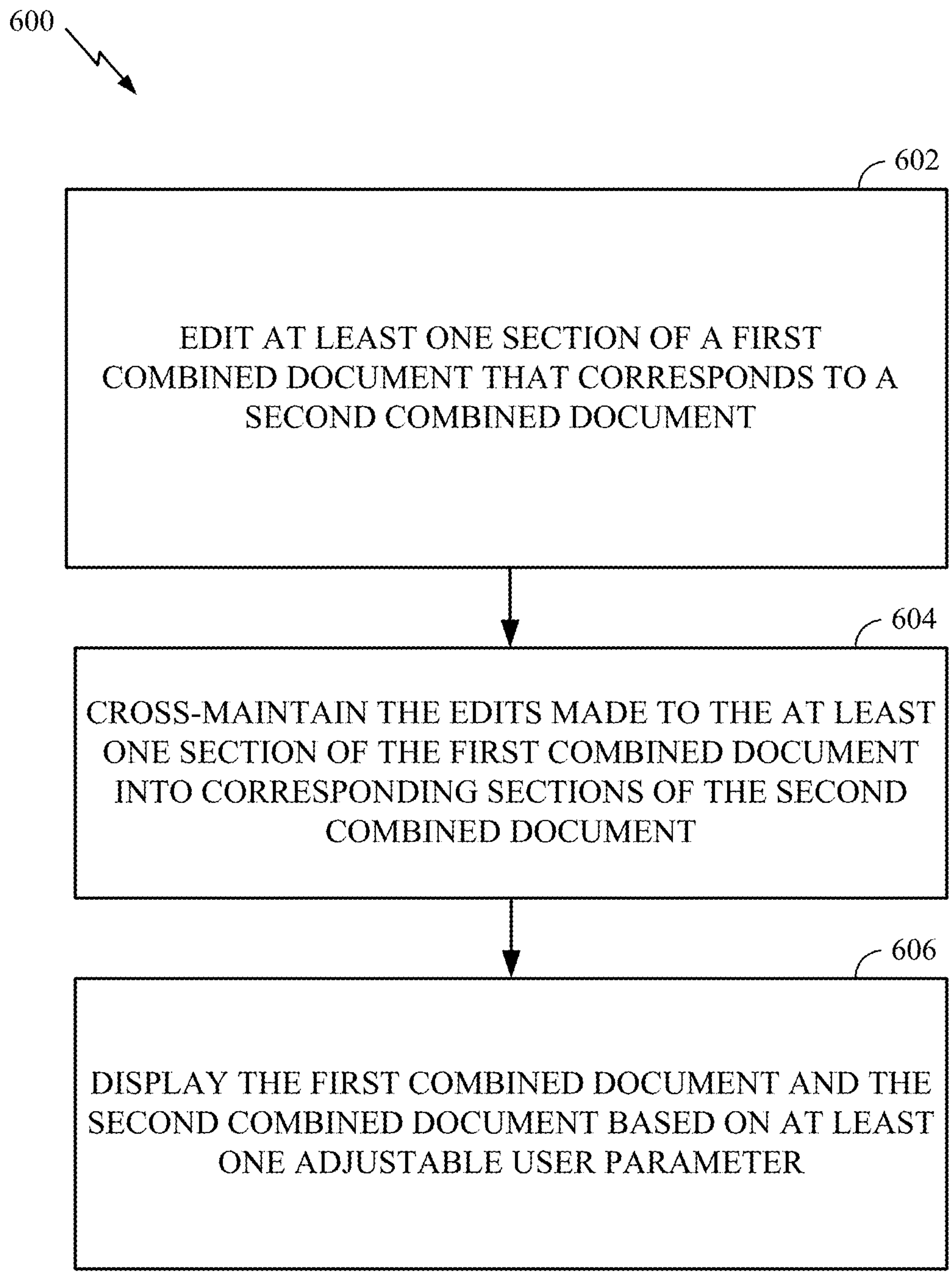
FIG. 6 is a process flow diagram illustrating a process to use a content management system according to aspects of the disclosure.

FIG. 6 is a process flow diagram illustrating a process 600 to use a content management system according to aspects of the disclosure. In block 602, at least one section of a first combined document is edited, the first combined document corresponding to a second combined document. In block 604, the edits made to the at least one section of the first combined document are cross-maintained into corresponding sections of the second combined document. In block 606, the first combined document and the second combined document are displayed based on at least one adjustable user parameter.

In one aspect of the present disclosure, the editing at least one section includes editing at least one field of a first section of the at least one section that corresponds to a second field of the at least one section; and cross-maintaining the edits made to the at least one field of the first section into corresponding fields of the second section.

In one aspect of the present disclosure, the adjustable user parameter includes a search bar, a sort by pull-down menu, a focus by selector and at least one slider. Furthermore, the at least one slider comprises a content-specific slider, a music video slider, a commercial slider, a narrative slider, an analytic-based slider, a most viewed slider, a filename-based slider, and a longish term name slider.

Figure 7:
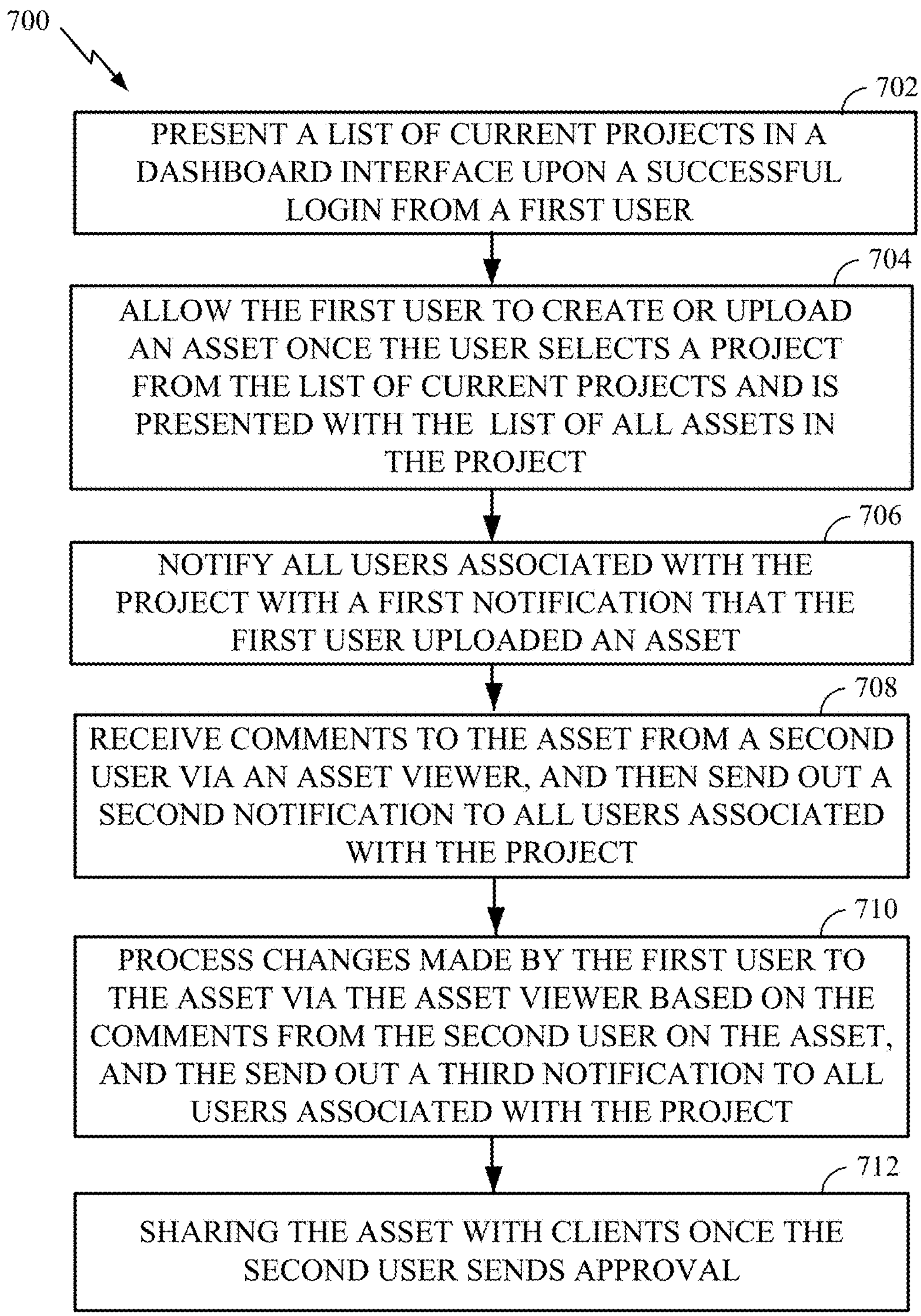
FIG. 7 is a process flow diagram illustrating another process to use a content management system according to aspects of the disclosure.

FIG. 7 is a process flow diagram illustrating another process 700 to use a content management system according to aspects of the disclosure. In block 702, the content management system presents a list of current projects in a dashboard interface upon a successful login from a first user. In block 704, the content management system allows the first user to create or upload an asset once the user selects a project from the list of current projects and is presented with the list of all assets in the project. In block 706, the content management system notifies all users associated with the project with a first notification that the first user uploaded an asset. In block 708, the content management system receives comments to the asset from a second user via an asset viewer, and then sends out a second notification to all users associated with the project. In block 710, the content management system processes changes made by the first user to the asset via the asset viewer based on the comments from the second user on the asset, and then sends out a third notification to all users associated with the project. In block 712, the content management system shares the asset with the clients once the second user sends approval.

In one aspect of the present disclosure, receiving comments to the asset from a second user includes receiving written input from the second user on the asset; and allowing the second user to block the asset from being shared with clients.

In one aspect of the present disclosure, the above process may further include the second user interacting with the first notification to be taken to the asset viewer where the second user can leave comments on the asset.

In one aspect of the present disclosure, the above process may further include the first user interacting with the second notification to be taken to the asset viewer where the first user can make changes to the asset.

In one aspect of the present disclosure, the above process may further include the second user interacting with the third notification to be taken to the asset viewer where the second user can send approval of the changed asset. Furthermore, the above process may further include a third user interacting with the third notification to be taken to the asset viewer where the third user can send an un-approve action that cancels the approval sent by the second user. In addition, the above process may further include the third user being able to add comments to the asset via the asset viewer. Furthermore, sharing the asset with clients once the second user sends approval includes authorized users from all the users associated with the project being able to share the asset with clients. In addition, the authorized users include the first user, the second user and the third user. Furthermore, the authorized users are able to share the asset with clients via the asset viewer.

Application Screens

Figure 8:
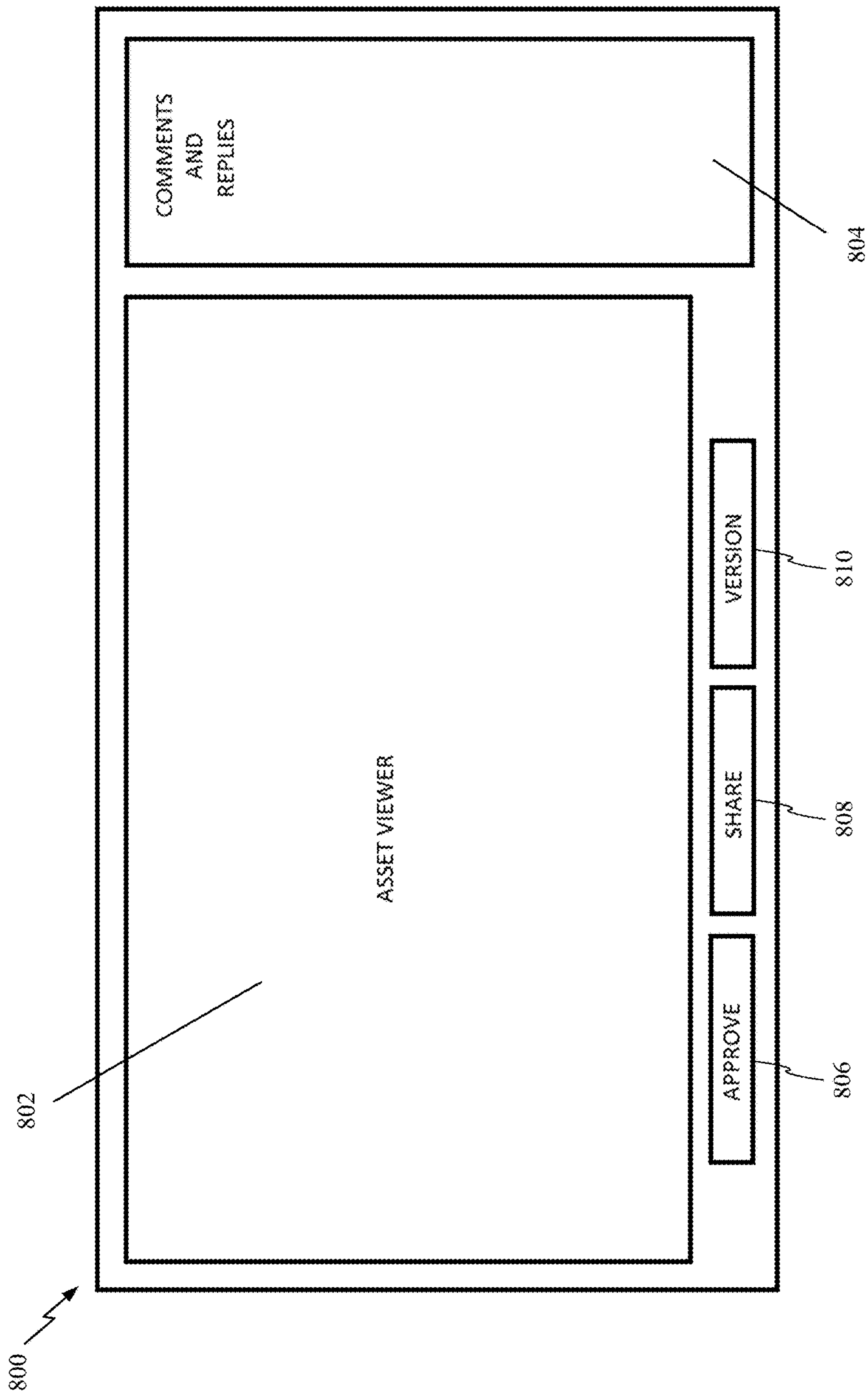
FIG. 8 shows an example application screen of the content management system according to aspects of the disclosure.

FIG. 8 shows an example application screen 800 of the content management system according to aspects of the disclosure. The application screen 800 includes asset viewer 802, comment and reply area 804, approve button 806, share button 808 and version button 810.

The asset viewer 802 displays the current asset that the user has selected. This may be the primary way of interacting with assets. The asset viewer 802 also displays the asset. The asset can be, for example, a PDF document, an image, an universal document format and so on.

The comment and reply area 804 is a box where users can read and respond to comments with their own replies. Users can type in responses and have them appear in the comment and reply area 804 so they can be read by all users, or just users associated with a particular asset.

The application screen 800 also has the approve button 806, the share button 808 and the version button 810. The approve button 806 allows the user to approve of an asset once clicking it. The approve button 806 also allows the user to block an asset from being shared. The approve button 806 can also function as an "un-approve" button that an user can click to notify other users that changes still need to be made to the asset shown in the asset viewer 802. The share button 808 allows the user to share an asset with other parties such as third-party clients or other users. The version button 810 allows a user to version an asset, with the action of versioning described above as a type of updating. The approve button 806, the share button 808 and the version button 810 may also be grouped or organized into a tools area, which is not shown in FIG. 8 but can be easily arranged as a box or border around all three buttons 806, 808 and 810. The approve button 806, the share button 808 and the version button 810 can also be itemized as icons or selections in a pull-down menu that the user can click on or interact with.

The following elements of the new/upload asset dialogue, the edit asset dialogue, the share asset dialogue and the asset editor may not be shown in FIG. 8, but can always be implemented in the application screen 800.

The new/upload asset dialogue (not shown, but could appear in FIG. 8) is displayed when the new button is clicked in the "projects" list. The new/upload asset dialogue allows the current user to create a new asset or upload an existing asset into the project. The user enters the asset name and other information as appropriate.

The edit asset dialogue (not shown, but could also appear in FIG. 8) is displayed when the "properties" button is clicked on a media item. The edit asset dialogue allows the current user to manage the current settings for the current type of media.

The share asset dialogue (not shown, but could also appear in FIG. 8) is displayed when the current user clicks the "share" button or icon in the asset viewer or the project detail list. The share asset dialogue allows the current user to share the asset to other users of the content management system, or users outside of the content management system.

The asset editor (not shown, but could also appear in FIG. 8) displays the current asset that the user has selected. This may be the primary way of editing assets. The asset editor is also similar to the asset viewer, but with additional functionality for editing the asset.

Workspace Screens

Figure 9:
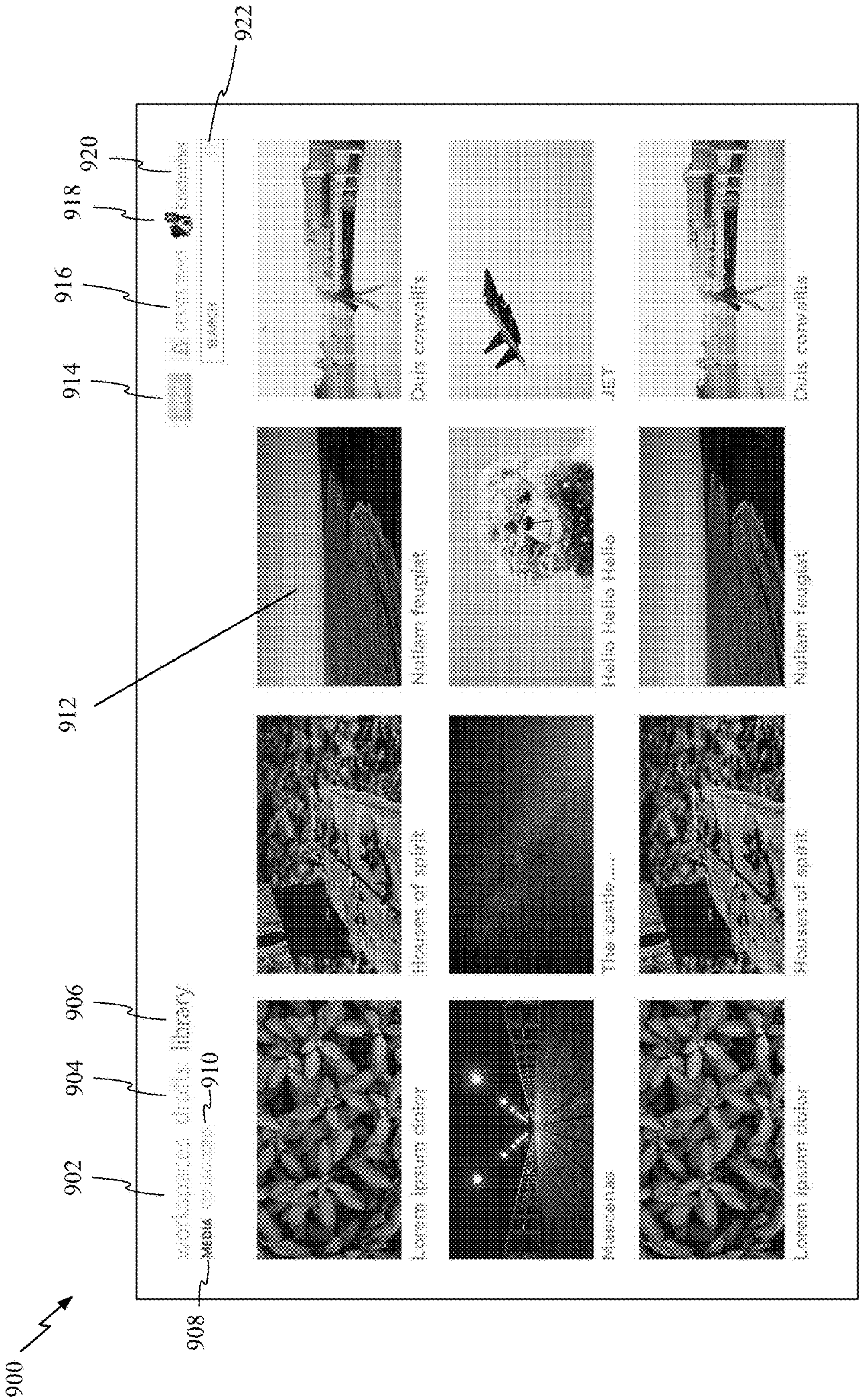
FIG. 9 shows an example workspace of the content management system according to aspects of the disclosure.

FIG. 9 shows an example workspace 900 according to aspects of the present disclosure. A workspace 900 includes a workspace button 902, a drafts list button 904, a library button 906, a media button 908, a collections button 910, a project 912, a new project button 914, a team button 916, a notification icon 918, an user identifier 920 and a search bar 922.

The workspace 900 displays a list, shown in rows in FIG. 9, of all the projects 912 for the current team that the current user (identified by the user identifier 920 as "Kristopher") has access to. The workspace 900 also allows the current user to create a new project 912 via the new project button 914, delete a project 912 (with buttons or icons not shown), or manage details of a project 912.

The new project dialogue (not shown) is displayed when the new project button 914 is clicked in the workspace 900. The new project dialogue allows the current user 920 to create a new project for the current team. The user 920 can enter the project name and adds team members as appropriate.

The edit project dialogue (not shown) is displayed when the properties button (not shown) is clicked on a project 912. The edit project dialogue (not shown) also allows the current user 920 to manage the current settings for the project.

The project detail list (not shown, but the application screen 800 shown in FIG. 8 is similar to the project detail list) is a list displaying all assets contained in the current project 912. The project detail list also allows the current user 920 to version assets, according to the versioning function/action described above, by dragging and dropping, deleting existing assets, creating new assets, sharing an asset or approving/blocking an asset. The aforementioned actions may also be itemized as icons, buttons or selections in a pull-down menu that the user 920 can click on or interact with. The project detail list also allows the current user 920 to manage the settings for the current project via the edit project dialogue.

Figure 10:
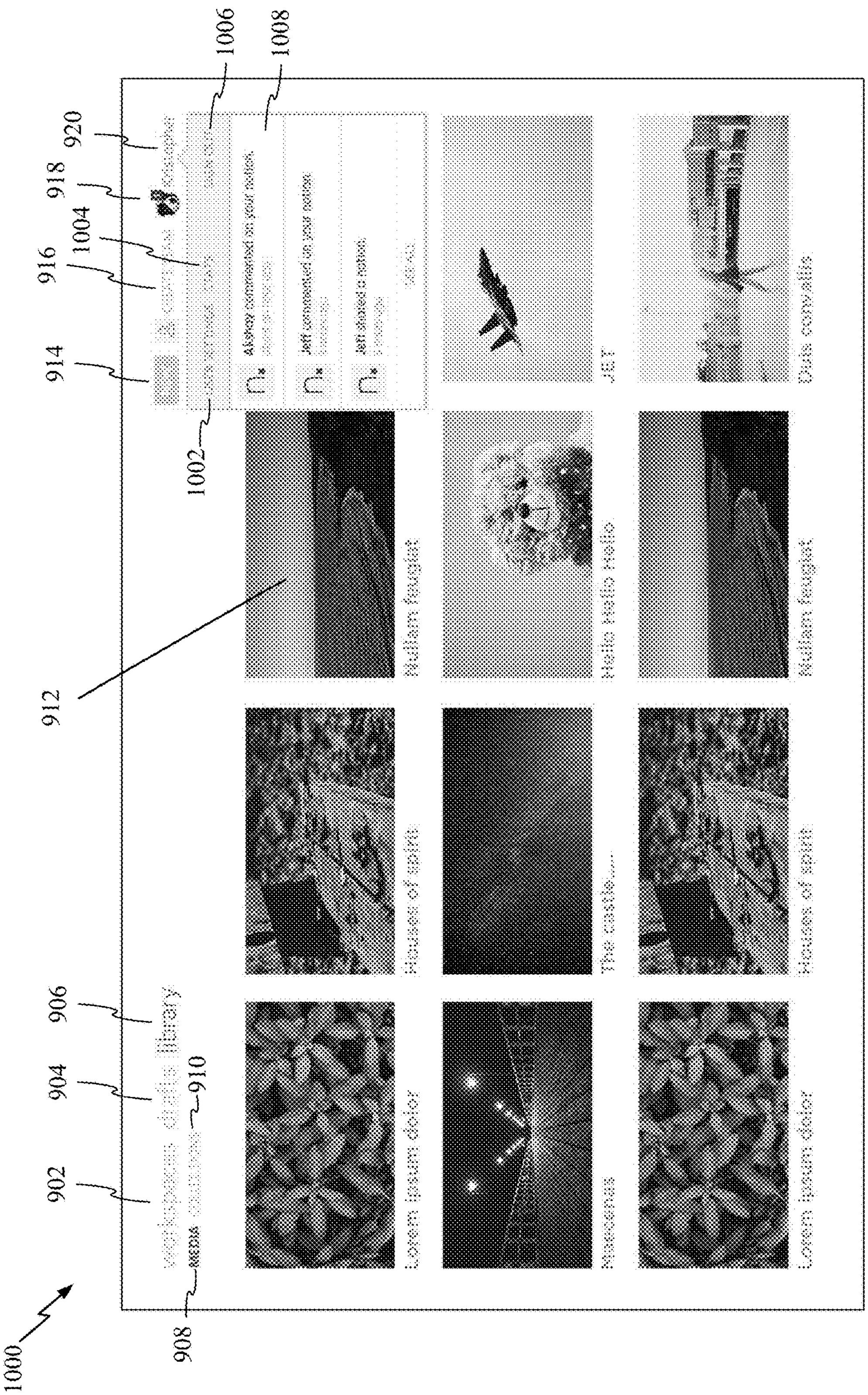
FIG. 10 shows another example workspace of the content management system according to aspects of the disclosure.

FIG. 10 shows another example workspace 1000 according to aspects of the present disclosure. Once clicked, the user identifier 920 displays a user settings button 1002, a user stats button 1004, a user sign out button 1006 and user notifications 1008. Once clicked, the user settings button 1002 displays the profile (not shown) for the current user. The user profile (not shown) also allows the user to change pertinent user information such as the user's e-mail address, password, profile picture, contact information, and so on. The user stats button 1004 can lead to a dialogue or separate screen showing analytics or other statistical information for the user identified by the user identifier 190. The user sign out button 1006 allows the user identified by the user identifier 920 to sign out of the content management system. The user notifications 1008 alert the user identified by the user identifier 920 actions that have occurred in certain assets for certain projects by certain users. To see examples of such notifications, see the description of the example workflow scenarios above, and FIG. 7 as well.

Figure 11:
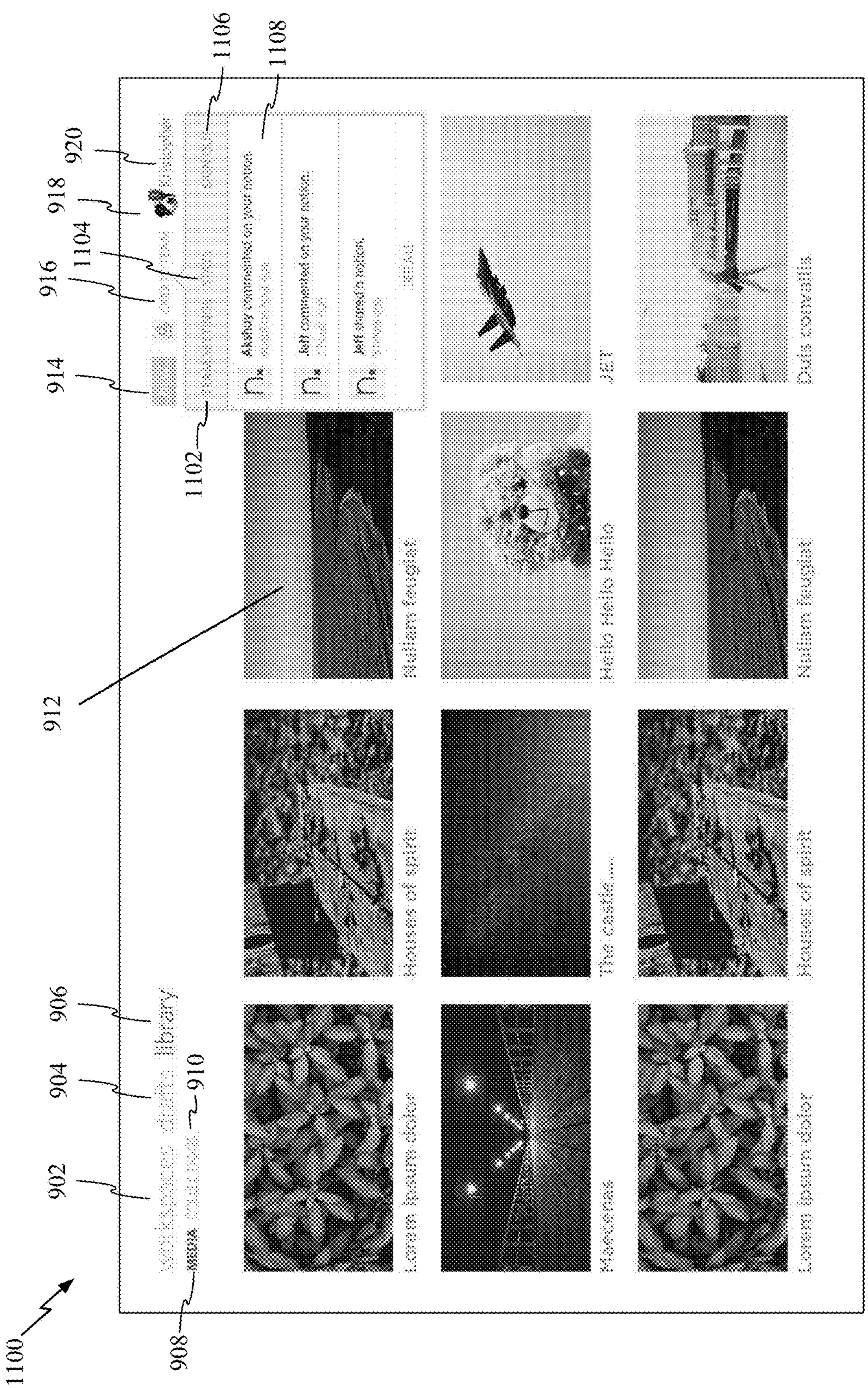
FIG. 11 shows yet another example workspace of the content management system according to aspects of the disclosure.

FIG. 11 shows another example workspace 1100 according to aspects of the present disclosure. Once clicked, the team button 916 displays a team settings button 1102, a team stats button 1104, a team sign out button 1106 and team notifications 1108. Once clicked, the team settings button 1002 displays the profile (not shown) for the current team. The team profile (not shown) profile also allows authorized users to change pertinent team information such as the team name, the team profile picture, team contact information or other details, and also allows authorized users to manage other authorized users that may be members of the team or may not be official members yet. The team stats button 1104 can lead to a dialogue or separate screen showing analytics or other statistical information for the team identified by the team button 916. The team sign out button 1106 allows the user identified by the team button 916 to sign out of the content management system. The team notifications 1108 alert the team identified by the team button 916 actions that have occurred in certain assets for certain projects by certain users. The team notifications 1108 can also be actions performed by users, projects or assets belonging to a certain team, or users, projects or assets belonging to other teams, if the settings are configured to display such information. To see examples of such notifications, see the description of the example workflow scenarios above, and FIG. 7 as well.

The add user dialogue (not shown in FIG. 11) is displayed when the "new user" button or icon (not shown) is clicked on in the team profile. The add user dialogue allows the current user to add new users to the team with appropriate permissions.

In one implementation, offline pitch documents may be used to send to different users in order to crowd source money or other funds. For offline documents, the same presentation interface is used where the documents are displayed on the reader or application and have no syncing until they connect to a connection. Once they are connected, people and other users can contribute crowd-sourced funds. With this approach, users may be able to privately raise funds, or privately raise investments in light of the JOBS Act, for example.

In one implementation, the above-described software can be applied to any form of document, and can also be used with any type of device such as a computer, smartphone, tablet, and so on. For example, presentations, word documents, videos, music files, and so on may be edited, revised, presented, displayed, marketed, distributed and sold on software executable on any device. The software may also be any type of code executable on processor(s), or other such components.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A method, comprising:

presenting a list of current projects in a dashboard interface, upon a successful login from a first user;

allowing the first user to create or upload an asset once the user selects a project from the list of current projects and is presented with the list of all assets in the project;

notifying all users associated with the project with a first notification that the first user uploaded an asset;

receiving comments to the asset from a second user via an asset viewer and then sending out a second notification to all users associated with the project;

processing changes made by the first user to the asset via the asset viewer based on the comments from the second user on the asset and then sending out a third notification to all users associated with the project; and sharing the asset with clients once the second user sends approval, wherein the second user interacts with the third notification and is taken to the assert viewer where the second user can send approval of the changed asset, and a third user interacts with the third notification and is taken to the asset viewer where the third user can send an un-approve action that cancels the approval sent by the second user, and further wherein sharing the asset with clients once the second user sends approval comprises authorized users from all the users associated with the project being able to share the asset with clients.

2. The method of claim 1, wherein receiving comments to the asset from a second user comprises:

receiving written input from the second user on the asset; and allowing the second user to block the asset from being shared with clients.

3. The method of claim 1, further comprising the second user interacting with the first notification to be taken to the asset viewer where the second user can leave comments on the asset.

4. The method of claim 1, further comprising the first user interacting with the second notification to be taken to the asset viewer where the first user can make changes to the asset.

5. The method of claim 1, further comprising the third user being able to add comments to the asset via the asset viewer.

6. The method of claim 1, wherein the authorized users comprises the first user, the second user and the third user.

7. The method of claim 1, where the authorized users are able to share the asset with clients via the asset viewer.

* * * * *